(12) United States Patent
Bennett et al.

(10) Patent No.: US 10,909,692 B2
(45) Date of Patent: Feb. 2, 2021

(54) SYSTEM AND METHOD OF DETECTING AND ACTING UPON MOVING OBJECTS

(71) Applicants: Andrew Bennett, Belmont, MA (US); Kathleen Wienhold, Arlington, MA (US); Krzysztof Orzel, Grudziadz (PL)

(72) Inventors: Andrew Bennett, Belmont, MA (US); Kathleen Wienhold, Arlington, MA (US); Krzysztof Orzel, Grudziadz (PL)

(*) Notice: Subject to any disclaimer, the term of this patent is extended or adjusted under 35 U.S.C. 154(b) by 175 days.

(21) Appl. No.: 16/220,172

(22) Filed: Dec. 14, 2018

(65) Prior Publication Data

US 2020/0193617 A1  Jun. 18, 2020

(51) Int. Cl.

| G06K 9/00 | (2006.01) |
|---|---|
| G06T 7/215 | (2017.01) |
| H04N 5/232 | (2006.01) |
| G06K 9/32 | (2006.01) |
| H04N 7/18 | (2006.01) |
| B64C 39/02 | (2006.01) |
| G06T 7/73 | (2017.01) |

(52) U.S. Cl.
CPC ............ *G06T 7/215* (2017.01); *B64C 39/024* (2013.01); *G06K 9/3241* (2013.01); *G06T 7/73* (2017.01); *H04N 5/23229* (2013.01); *H04N 7/185* (2013.01); *B64C 2201/127* (2013.01)

(58) Field of Classification Search
CPC ....... G06T 7/215; G06T 7/73; H04N 5/23229; H04N 7/185; H04N 7/18; G06K 9/3241; B64C 39/024; B64C 2201/127

USPC .......................................................... 382/103
See application file for complete search history.

(56) References Cited

U.S. PATENT DOCUMENTS

| 2013/0124020 A1* | 5/2013 | Duggan | G08G 5/0086 |
|---|---|---|---|
| | | | 701/3 |
| 2015/0098614 A1* | 4/2015 | Gee | G06K 9/00671 |
| | | | 382/103 |
| 2015/0220086 A1* | 8/2015 | Willgert | G05D 1/0231 |
| | | | 701/26 |
| 2016/0299509 A1* | 10/2016 | Ueda | B25J 9/1676 |
| 2017/0098132 A1* | 4/2017 | Yokota | G06K 9/00805 |
| 2019/0164010 A1* | 5/2019 | Ma | G06K 9/3233 |
| 2020/0193617 A1* | 6/2020 | Bennett | G06K 9/3241 |

* cited by examiner

*Primary Examiner* — Van D Huynh
(74) *Attorney, Agent, or Firm* — Willard Alonzo Stanback, PC

(57) ABSTRACT

Described is a system and method through which (a) information related to detected moving objects can be received, processed and confirmed, (b) such information can be evaluated—with the information from differing receiving, processing and confirming sources being aggregated and integrated, thereby increasing the overall efficiency and accuracy of the system and method, and with the elements of the system and the practice of the method resulting in the sharing of such information with such elements controlling various aspects of their own operation—to assess the possible impacts of the presence and/or operation of such detected moving objects within a specific environment, and as a result of such evaluation (c) actions can be initiated based upon (x) the identification of the detected moving object and (y) the possible impacts thereof within such specific environment.

27 Claims, 6 Drawing Sheets

SYSTEM AND METHOD OF DETECTING AND ACTING UPON MOVING OBJECTS

FIELD OF INVENTION

The invention relates generally to a system in which information related to the movement of detected moving objects in a specific environment can be received, evaluated, and acted upon, and a method of so receiving, evaluating and initiating prescribed actions.

COPYRIGHT NOTICE

A portion of the disclosure of this patent application contains material that is subject to copyright protection. Noting the confidential protection afforded non-provisional patent applications prior to publication, the copyright owner hereby authorizes the U.S. Patent and Trademark Office to reproduce this document and portions thereof prior to publication as necessary for its records. The copyright owner otherwise reserves all copyright rights whatsoever.

BACKGROUND

For security and other reasons, it is at times beneficial to detect the presence and monitor the movement of objects in a specific area. For example, an individual in the wilderness might want to have a clear understanding of when certain animals are in proximity to their location. Managers of the grounds of certain institutions (like, for example, university campuses, governmental buildings, prisons and military facilities) might want to monitor the movement of individuals in open areas in attempts to detect the approach of any unauthorized personnel. With the increased use of drones, the owners and operators of, for example, marinas, luxury housing, function venues, sports arenas, industrial facilities, and secured governmental buildings are increasingly in need of systems and methods of monitoring the airspace above their areas of interest for drones and other airborne objects that are unauthorized or may otherwise be considered threats.

There are a variety of systems that allow users to gather various information from within and outside of the environments in which they exist. Some of these systems can be used to detect and monitor the moving objects that are presently within the range of their detection. Many of such systems, however, are lacking in their ability, in a coordinated way, to receive information from differing detection systems (especially in cases where the scopes of the systems' detection areas differ), to analyze the information in the context of a specific [local] environment based upon preestablished parameters, and to initiate pre-determined actions based upon such information.

Another shortcoming of certain systems and methods is their inability to appropriately and adequately consider and account for preexisting aspects of the specific environment being monitored (e.g. stationary objects, trees and bushes, natural formations, buildings, roadways, current weather, authorized personnel or vehicles in the area, etc.). The level of the consideration of the preexisting environment has a direct influence upon the sensitivity of the system in detecting and monitoring the more discrete movements therein. Parallel in the inability to consider a specific environment's preexisting aspects is an inability to identify and account for objects within such an environment that are not preexisting but are nonetheless expected to be in the environment. Such expected objects could be, vehicles of specific type (e.g., boats, cars and trucks of certain sizes), birds, people, and drones (of certain design and registration).

Also, historically, detection systems, like a targeting radar, depended only upon their own operative elements to identify and classify a target. The gathered information would then be relayed to a different system for tracking purposes. There are, of course, risks associated with such multi-system operations, in particular, the risks of incompatibility, latency, and failure to transfer information as best needed.

The foregoing describes some of the shortfalls of the prior systems and methods. The present inventions (both the system and the method) are designed and have been developed to address these considerations and other challenges in the prior art.

SUMMARY

The present invention comprises a system and a method through which the movements of objects are monitored. In one embodiment of the present invention, the system includes a means for processing both preestablished and dynamically received information. This processing element preferably can (a) aggregate and integrate information from one or multiple sources to thereby more efficiency and accuracy confirm the presence and movement of detected moving objects within a specific environment, (b) aggregate and integrate information from one or multiple sources to thereby more efficiency and accuracy evaluate any possible impacts of the presence and/or operation of the moving objects within the specific environment; and (c) initiate actions based upon (x) the identification of the moving objects and (y) the possible impacts thereof within such specific environment.

The system also preferably includes a means for receiving information about certain other objects in the specific environment. This detecting element—focused primarily upon fixed objects—is electronically connected to the processing element. A preferred third element of the inventive system is a means for receiving information about then-current parameters of the specific environment. Like the first 'fixed objects' detecting element, this detecting element—focused primarily on the current environment—is electronically connected to the processing element. A preferred fourth element is a third detector. This detecting element—focused primarily upon information about movable objects that are expected to be in the specific environment, is also electronically connected to the processor. A preferred fifth element, a fourth detector—focused upon information related to detected moving objects sensed within the specific environment—is likewise electronically connected to the processing element. The fifth component of this particular embodiment of the present inventive system is a means for communicating with (e.g., transmitting to) other systems and/or devices (1) desired information about the detected moving objects in the specific environment and (2) actions to be initiated (if any) in connection with the moving objects, with the communicating element electronically connected to the same processing element. Such transmitter is preferably, but not necessarily, also capable of receiving information that can be utilized in the operation and functioning of the processing element.

In another embodiment of the present invention, the method of monitoring the movement of at least one moving object includes the step of receiving information about certain fixed objects in such specific environment. Another step is the receiving of information about the then-current parameters of the specific environment.

A third step is the receiving of information about movable objects expected to be in the specific environment. A fourth step is the receiving of identifying information related to the actual moving objects sensed within such specific environment. As part of a fifth step (in sub-steps), preestablished and dynamically received information is processed (a) with the aggregation and integration of information from multiple sources, to more efficiently and accurately confirm the presence, identity and movement of moving objects within the specific environment, (b) with the aggregation and integration of information from multiple sources, to more efficiently and accurately evaluate possible impacts of the presence and/or operation of the moving objects within the specific environment, and (c) to initiate actions (if need be) within the specific environment based upon the identification of the moving objects and the possible impacts thereof. A sixth step is the communicating (e.g., transmitting outside of system) of desired information about (x) the moving objects in the specific environment and (y) any actions to be initiated in connection the moving objects to other systems and/or devices.

DETAILED DESCRIPTION

Figure 1:
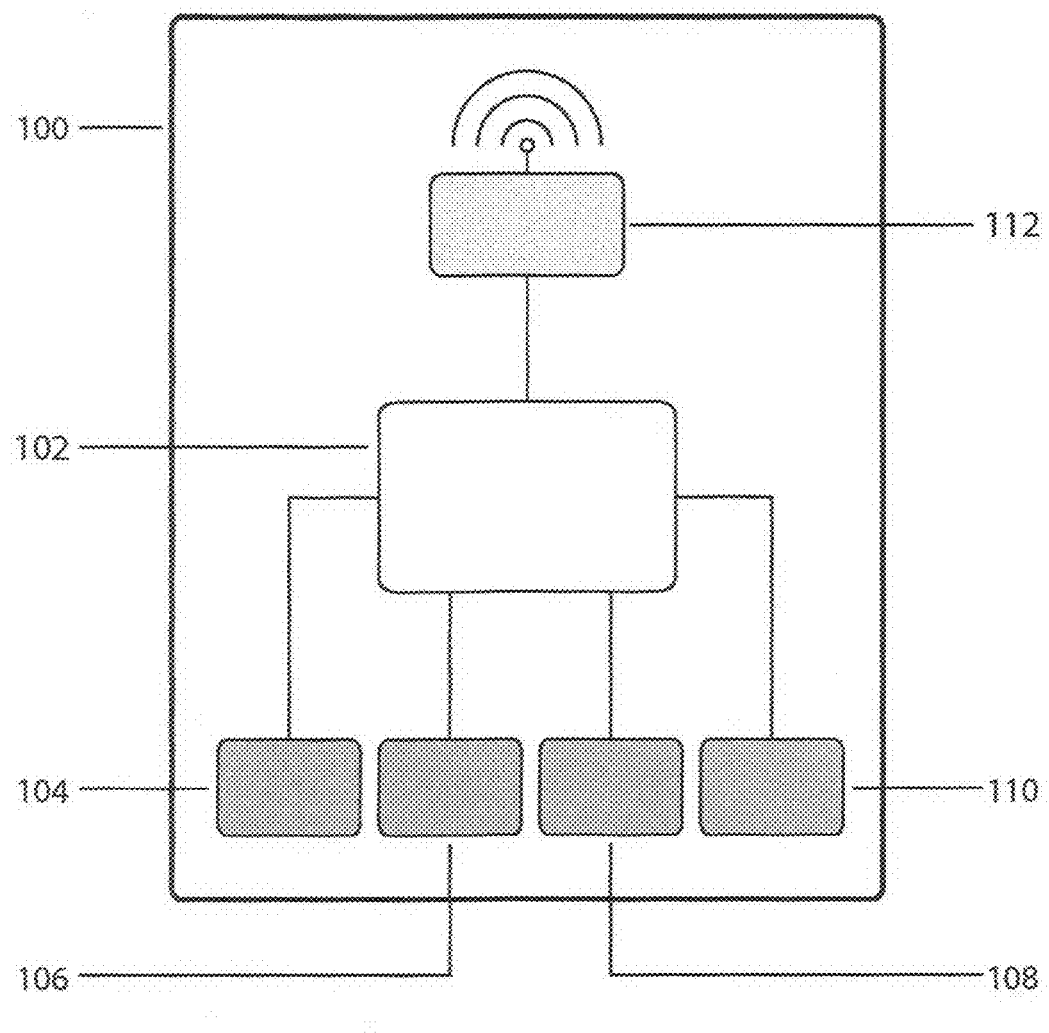
FIG. 1 shows an embodiment of the present inventive system that includes a processor, multiple detecting and input elements, and a transmitter.

FIG. 1 shows a system embodiment of the present invention—system 100. This particular embodiment includes processor 102, which is capable of processing preestablished and dynamically received information. Processor 102, for example and preferably, can (a) confirm the presence and movement of a detected moving object within the specific environment it is slated to monitor, (b) evaluate any possible impacts of the presence and/or operation of such moving object within the specific environment; and (c) initiate actions based upon (x) the identification of such moving object and (y) the possible impacts thereof within such specific environment. System 100 also preferably includes input element 104, which is capable of receiving information about certain other objects in the specific environment. Input element 104—focused primarily upon fixed objects—could be for example a detector of the kind used to perform other functions in system 100 or another means of receiving information about the fixed objects into system 100 (like, for example, an uploading element through which data about the environment cold be introduced). Whatever the form, input element 104 is electronically connected to processor 102. A preferred third element of the inventive system is detector 106, which is capable of receiving information about then-current parameters of the specific environment. Like input element 104 when in the form of a detector, detector 106—focused primarily on the current environment—is electronically connected to processor 102. A preferred fourth element is input element 108—focused primarily upon information about movable objects that are expected to be in the specific environment. Input element 108 could be for example a detector of the kind used to perform other functions in system 100 or another means of receiving information about the expected objects (like, for example, an uploading element through which data about the environment cold be introduced). Whatever the form, input element 108 is also electronically connected to processor 102. Detector 110—focused upon information related to detected moving objects sensed within the specific environment—is likewise electronically connected to processing element 102. Transmitter 112 is capable of communicating (i.e., transmitting), to other systems and/or devices (1) desired information about the detected moving objects in the specific environment and (2) actions to be initiated (if any) in connection with the moving objects, with the communicating element electronically connected to the same processing element. Transmitter 112 may also be capable of receiving information that can be utilized in the operation and functioning of processor 102.

As discussed in more detail below, one of ordinary skill in the art would realize that one or more of the detector might be or have one or more of its elements mounted on, for example, an airborne drone. A drone as a detector could, for example, track its own location within the specific environment, could be used by multiple sensing elements of system 100 to monitor its own performance and the local environmental effects. The information detected by such drone could also be used to improve position reporting accuracy by system 100, and generally be used to debug and validate system 100, while such drone is moved throughout the specific environment.

An inventive component of processor 102 is its ability to aggregate and integrate information from multiple sources—thereby increasing the efficiency and accuracy of system 100. For example, processor 102 could be configured to assist in the self-calibration of system 100 by analyzing information from multiple sources and using the information from the differing sources to confirm the 'base set' (e.g., then-current conditions when system 100 is initiated). Such multiple source analysis could also reduce false alarms. The information received from multiple sources could also be used to improve identification of a moving object. For example, the received information (beyond the then-current conditions) could to be compared with specific known information about various moving objects (e.g. doppler information). Such an approach could also help to reduce the false alarm rate and to increase the effective range at which the system can identify moving objects.

Further, the ability to aggregate and integrate multiple sources of information can facilitate the 'self-adapt' of system 100 to changes in the specific [local] environment. For example, where a single operational element of input element 104 receives a continuous stream of information about the exact location(s) of fixed objects in the environment, system 100 can then use that continuous stream to improve the sensing accuracy of system 100, as the information of such continuous stream is compared with and contrasted against other information received. In another example, multiple operational elements of input element 108 could be receiving information for the same at-first stationary target (later in motion, as expected). The aggregation of the resulting information could be used to delete any "shadow zones" that each element might otherwise have. A third example could include the receipt of information by detector 106, which could automatically update the model used by system 100 for local conditions and thus, for example, re-calibrate the effective sensing range of one or more elements of system 100 as the current conditions change. By way of further example, detector 106 might be detecting weather and visibility conditions. In a fourth example, an element of input element 104 communicates with detector 106. Through such communications, the detector can calibrate and re-calibrate, thereby maximizing the detecting coverage of system 100 based upon the shared capabilities of the detectors. Yet another example, false alarms can be suppressed as one or more elements of input element 108 detect a target which, based upon the information received, should also be detectable by one or more elements of detector 110. Accordingly, the elements of input element 110—focused upon moving objects in the environment in general—can be utilized to verify or refute the information received by input element 108—focused upon moving objects expected to be in the environment.

In a particular embodiment of the present invention, processor 102 also has the capacity to store some or all of the information (preloaded) that it needs to confirm the presence and movement of detected moving objects. In addition or conversely, some or all of such information could be stored in a separate element within system 100 or transmitted into system 100 from a remote location. Such information for confirmation could include, for example, images of known moving objects, which could be compared with images of moving objects in the specific environment, rf-doppler profiles of known moving objects which could be expected to be in the environment. Software embedded in processor 102 could be used to perform the comparison tasks. If and as necessary, processor 102 could employ outside software to assist in the performance of the confirmation tasks of processor 102. The ability to process both preestablished and dynamically received information supports functioning of processor 102 in real time.

This 'real-time' functioning is critical to the timely evaluation of any possible impacts of the presence and/or operation of such moving object within the specific environment. As with the operation of the comparison task, processor 102 preferably has the capacity to store some or all of the information (preloaded) that it needs to evaluate the possible impacts. In addition or conversely, some or all of such information could be stored in a separate element within system 100 or transmitted into system 100 from a remote location. Such information in support of the evaluation tasks include, for example, information about the types of cameras a detected airborne drone may be carrying, the historically known facts about the types of weaponry a particular airborne drone may readily carry, or the capacity of a particular type of airborne drone to carry an explosive device of a certain destructive size. Software embedded in processor 102 could be used to perform the evaluation tasks. If and as necessary, processor 102 could employ outside software to assist in the performance of the evaluation tasks of processor 102.

The 'real-time' functioning is also critical to the timely initiation of actions by processor 102. As with the operation of the comparison and evaluation tasks, processor 102 preferably has the capacity to store some or all of the information (preloaded) that it needs to initiate actions. Such actions may be performed by processor 102, otherwise within system 100, or outside of system 100. In addition or conversely, some or all of such information for the initiation of actions could likewise be stored in a separate element within system 100 or transmitted into system 100 from a remote location. Such instructive information, along with (x) the identification of the detected moving object and (y) the possible impacts thereof, could cause, for example, an alarm to be sounded, the dispatching of an interceptor (be it a person, animal, or equipment—e.g. a defensive drone), or the suspension of activity within the specific environment until such time that any potential threat that could be caused by the detected moving object has dissipated. Software embedded in processor 102 could be used to initiate the desired action(s). If and as necessary, processor 102 could also employ outside software to assist in such initiation.

Input element 104, focused primarily upon fixed objects and electronically connected to processor 102, could be, for example, a port through which information about the specific environment is, in essence, uploaded into system 100. Input element 104 could be, for example, one or more of the following sensor technologies: radar, lidar, cameras, or other detectors. Further, detecting input 104 could be fixed or mobile (e.g. UAV, UGV, or mounted on manned vehicles, drones, or cars—for example).

In another embodiment, input element 104 could be a subsystem capable of mapping, for example, the terrain, buildings, trees, and other fixed aspects of the specific environment. Examples of components that might preferably be part of input element 104 include, as discussed above, drone technology, or also manned and unmanned ground vehicles, water surface vehicles, underwater vehicles, radars, lidars, cameras (both stereo and mono), structured light sensors, multispectral imagers and other apparatus and technology that one of ordinary skill in the art reasonable believe to helpful in the receiving of information by input element 104.

Like input element 104, detector 106 is focused primarily on the current environment and is electronically connected to processor 102. Unlike input element 104, however, detector 106 is capable of receiving the dynamically changing aspects of the specific environment. Input element 104 could comprise, for example, video cameras, sound sensors, radar equipment, various other monitoring technologies, and multiple combinations of the foregoing, all focused on the current conditions of the specific environment. Examples of components that might preferably be part of detecting element 106 include, as discussed above, drone technology, or also manned and unmanned ground vehicles, water surface vehicles, underwater vehicles, radars, lidars, cameras (both stereo and mono), structured light sensors, multispectral imagers and other apparatus and technology that one of ordinary skill in the art reasonable believe to helpful in the receiving of information by detecting element 106.

Input element 108, focused primarily upon movable objects that are expected to be in the specific environment and also electronically connected to processor 102, could be, for example, a port through which information about the specific environment is, in essence, uploaded into system 100. In another embodiment, input element 104 could be a subsystem capable of interconnecting with, for example, authorized drones. In one particular embodiment of the inventive system, a known drone could (A) track its own location, (B) be used by multiple detecting elements to sense and characterize their own performance and the local environmental effects, (C) improve the applicable position reporting accuracy, and (D) in general debug and validate the system of detectors.

Examples of components that might preferably be part of input element 108 include, as discussed above, drone technology, or also manned and unmanned ground vehicles, water surface vehicles, underwater vehicles, radars, lidars, cameras (both stereo and mono), structured light sensors, multispectral imagers and other apparatus and technology that one of ordinary skill in the art reasonable believe to helpful in the receiving of information by input element 108.

Detector 110, focused upon information related to detected moving objects sensed within the specific environment and is likewise electronically connected to processing element 102, is capable of dynamically receiving information for detecting, monitoring, and tracking objects that are intentionally placed in the specific environment for authorized purposes. Detector 110 could comprise, for example, video cameras, sound sensors, radar equipment, various other monitoring technologies, and multiple combinations of the foregoing, all focused on moving objects that are unnatural (i.e., not birds) and undesirable (e.g., unauthorized drones) within the specific environment. One of ordinary skill in the art could also reasonable believe that, as discussed above, drone technology, or manned and unmanned ground vehicles, water surface vehicles, underwater vehicles, radars, lidars, cameras (both stereo and mono), structured light sensors, multispectral imagers and other apparatus and technology could be helpful in the receiving of information by detecting element 110.

Transmitter 112, capable of communicating (e.g., transmitting) to other systems and/or devices (1) desired information about the detected moving objects in the specific environment and (2) actions to be initiated (if any) in connection with the moving objects, and also electronically connected to the processor 102, could consist one of a variety of communicating technology components. For example, transmitter 112 could be merely a transmitting element, with a primary function of transmitting information beyond system 100. Conversely, transmitter 112 could consist of known transmitting/receiving technology (in support of two-way communication). With two-way communication capabilities, transmitter 112 could function as a receptor of information for processor 102 and/or other elements of system 100.

Figure 2:
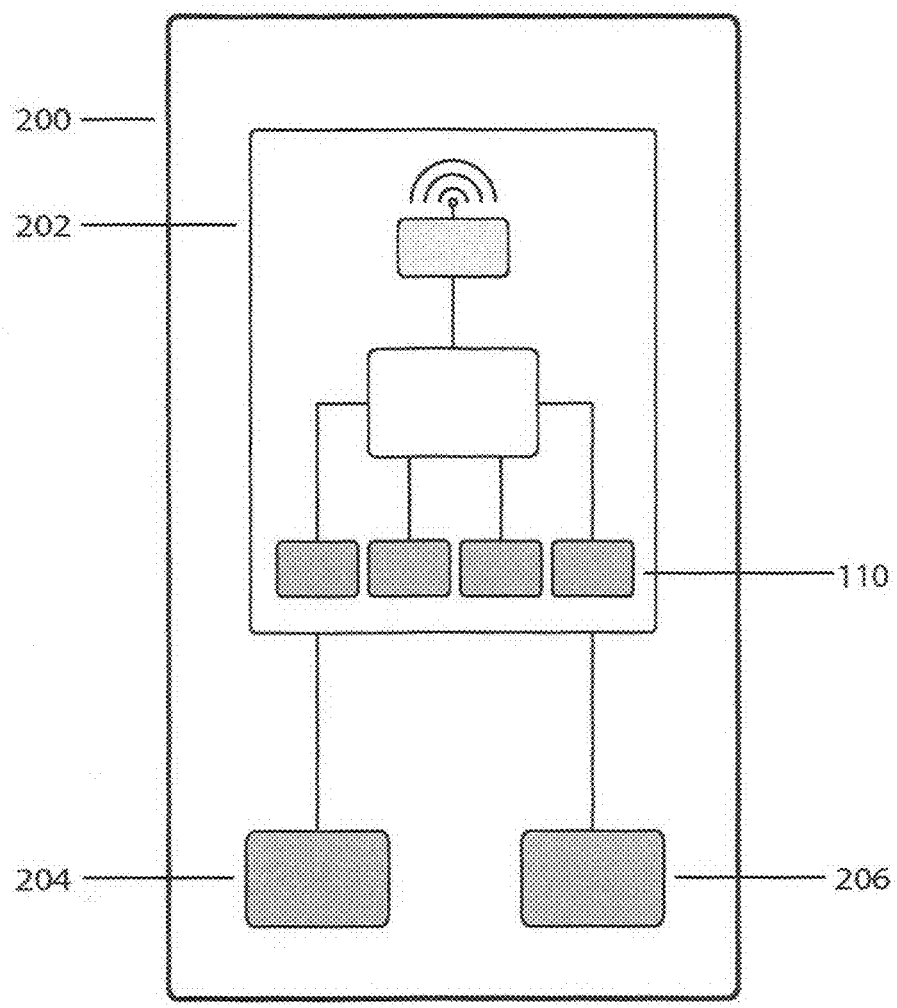
FIG. 2 shows an embodiment of the present inventive system in which one of the subsystems includes the elements of the embodiment of the invention shown in FIG. 1, and additionally the FIG. 2 system includes additional detecting and input elements.

FIG. 2 shows an embodiment of the present invention in which system 100 (above)—shown in FIG. 2 as subsystem 202—is part of system 200. As such, subsystem 202 could be characterized as the core of the system shown in FIG. 2, with detector 204 and detector 206—for example, additional radar, lidar, or cameras—being 'add-ons' for an embodiment like system 100 in FIG. 1. This particular embodiment further includes detector 204, which is capable of receiving information about then-current parameters outside of such specific environment, with such detector 204 electronically connected to subsystem 202. This embodiment also includes detector 206, which is capable of receiving information about such moving objects when such moving objects are outside of such specific environment. Detector 206 facilitates the evaluation of the possibility of such moving object entering into such specific environment, with detector 206 electronically connected to subsystem system 202. Such parameters regarding the area outside of the specific environment and results of such evaluation are parts of the information dynamically received by such detector 204 and such detector 206.

The processing of subsystem 202—in its aggregation and integration of information from multiple sources—could be even more efficient and accurate with the utilization of information supplied by detector 204 and/or detector 206, in real time. For example, subsystem 202 could be configured to assist in the self-calibration of system 200 by analyzing information from such detector. Such multiple source analysis could also provide additional information that would even further reduce false alarms. In another example, such detector could receive information that could automatically update the model used by subsystem 202 for local conditions and thus, for example, re-calibrate the effective sensing range of one or more elements of system 200 as the current conditions change. By way of further example, detector 204 might be detecting weather and visibility conditions. In still another example, an element of detector 206 communicates with detector 110 of subsystem 202. Through such communications, the detector can calibrate and re-calibrate as a moving object travels from the general and broader range of detector 206 into the more specific and narrower range of detector 110 of subsystem 202, thereby focusing the monitoring coverage of system 200 as objects move in closer proximity to the central area of the specific environment. Yet another example, false alarms can be suppressed as one or more elements of detector 206 detect a target which, based upon the information received, should also, later in time, be detectable by one or more elements of detector 110 of subsystem 202.

Figure 3:
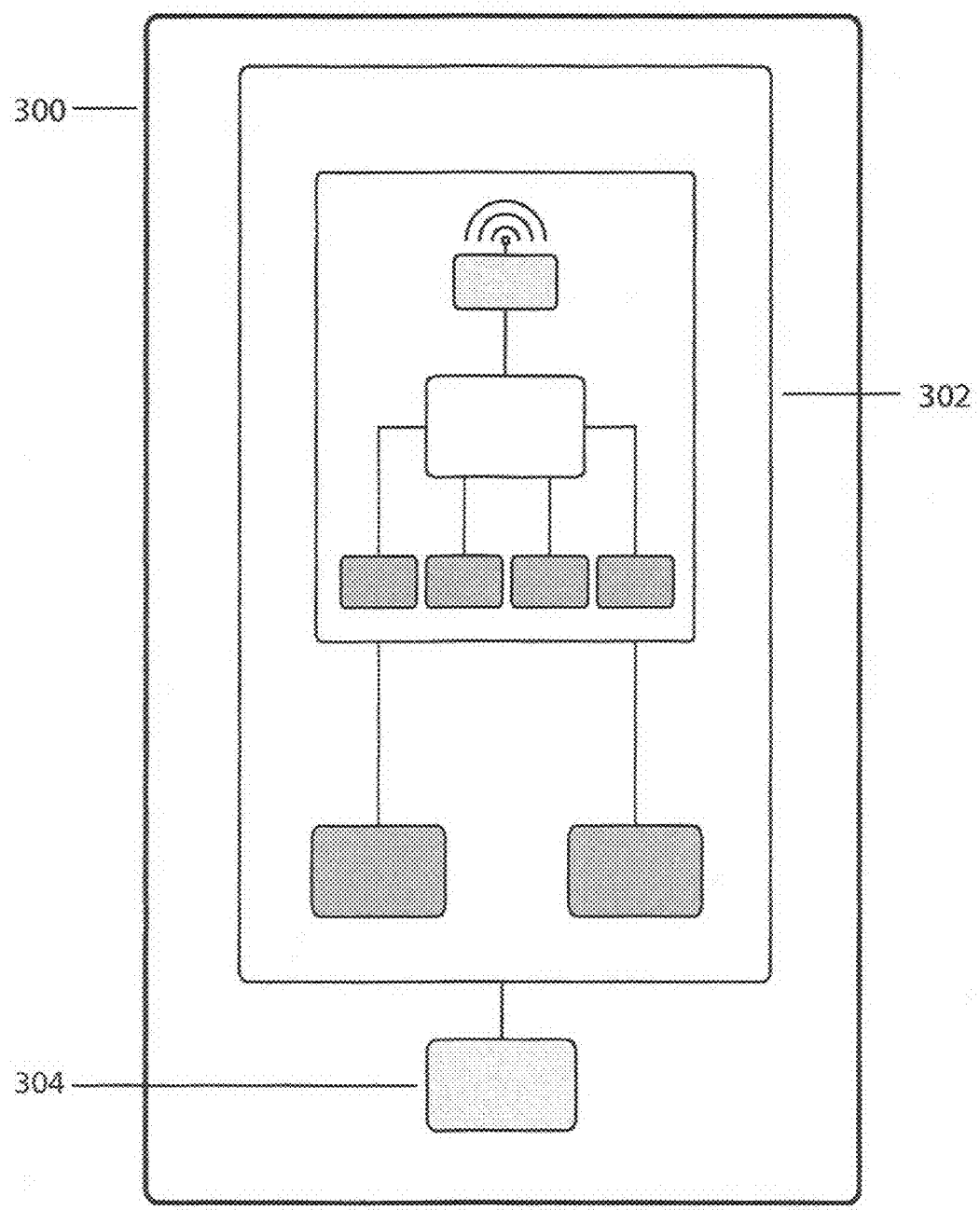
FIG. 3 shows an embodiment of the present inventive system in which one of the subsystems includes the elements of the embodiment of the invention shown in FIG. 2, and additionally the FIG. 3 system includes an information source.

FIG. 3 shows a third embodiment of the present invention. In this embodiment, system 300 includes the equivalents of system 100 and system 200—depicted herein as subsystem 302. System 300 further comprises information source 304, which is capable of providing information that can be used to further identify moving objects and to further evaluate the possible impacts of the presence/operation of such moving object within such specific environment. Such data of information source 304 could be provided through, for example, a direct and physical connection with subsystem 302 or wirelessly. In a particular embodiment of the present invention, information source 304 could be a 'built-in' database, a similar capacity, a 'cloud-based' storage facility, or a variation of the foregoing. In each such case of this embodiment, information source 304 is electronically connected to subsystem 302. Here, subsystem 302 could be characterized as the core of system 300 (as shown in FIG. 3), with information source 304 discretely being an 'add-on' for an embodiment—with subsystem 302 being like system 200 in FIG. 2, which itself has an embodiment like system 100 at its core).

The processing of subsystem 302—in its aggregation and integration of information from multiple sources—could be more efficient and accurate with the utilization of information supplied by information source 304, in real time. For example, subsystem 302 could be configured to assist in the self-calibration of system 300 by analyzing information from such information source or a pre-established, known target. Such multiple source analysis could also provide additional information, like a pre-calibrated signal strength or pre-determined target type that would even further reduce false alarms. In another example, such information source 304 could provide information that could automatically update the model used by subsystem 302 for local conditions and thus, for example, re-calibrate the effective sensing range of one or more elements of system 300 as the current conditions change.

Figure 4:
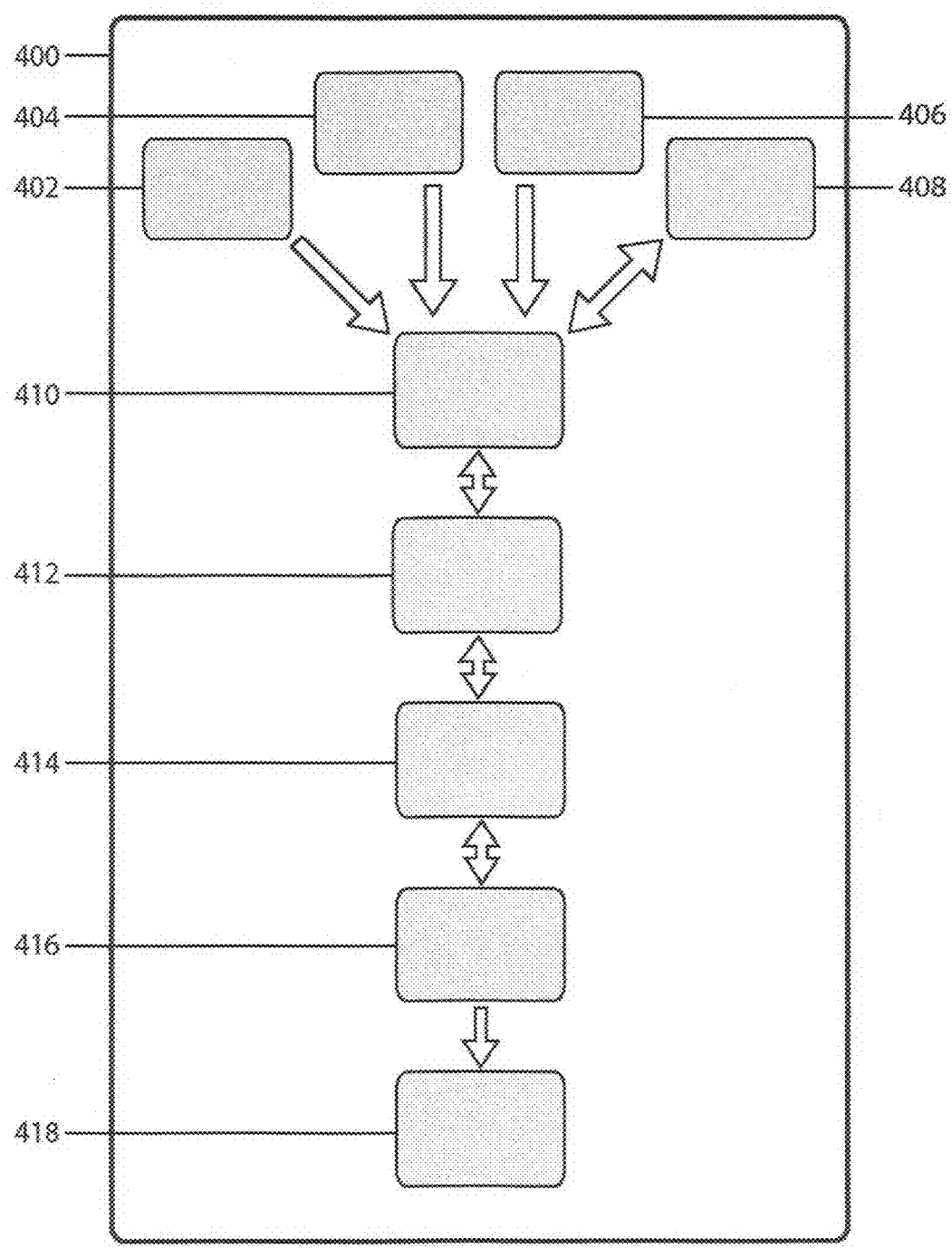
FIG. 4 is a flowchart that shows the steps of the present inventive method, including steps of that result in the confirmation of received information, the evaluation of the information, and the initiation of action based upon the information evaluated.

FIG. 4 shows a flowchart that depicts an inventive method of (a) receiving, processing and confirming the information related to detected moving objects, (b) with the information from differing receiving, processing and confirming sources being aggregated and integrated, evaluating such information to assess the possible impacts of the presence and/or operation of such detected moving objects within a specific environment, and as a result of such evaluation, and (c) initiating actions based upon (x) the identification of the detected moving object and (y) the possible impacts thereof within such specific environment. In the embodiment of the present invention shown in FIG. 4, the method (400) of monitoring the movement of at least one moving object includes the step of receiving information (402) about certain fixed objects in such specific environment. This step may be performed in preestablished intervals of time (e.g., minutes, hours, days or longer) depending upon the expected change in such fixed objects over time.

Another step (404) is the receiving of information about the then-current parameters of the specific environment. One of ordinary skill in the art would realize that receipt of the then-current parameters may also be accomplished over time in intervals, with the more acceptable interval of time being shorter in duration (e.g., microseconds or milliseconds) than the interval for fixed objects. For example, this particular step could involve the use of radars that communicate with each other. Otherwise, there could be a different means of measuring and evaluating the then-current parameters of the environment (e.g., possibly via "pings" sent to and received from a known target in the area (like a building) and monitoring the changes in over time of differing readings). By way of further example, one skilled in the art could use more traditional means or technology to be created to measure environmental aspects like the absorption of radar signal due to the humidity, rain, snow, soot, etc. in the air. The preferable result of this step is the self-calibration of the process as the weather changes.

A third step (406) is the receiving of information about movable objects expected to be in the specific environment. A fourth step (408) is the receiving of identifying information related to the actual moving object sensed within such specific environment.

Information received in steps 402, 404, 406 and 408 (inclusive of preestablished and dynamically received information), are transmitted to a processor in which the information can be evaluated—a fifth step (410), In a sixth step (412), the results of evaluation step 410 can be used in attempts to confirm the presence and track the movement of moving objects within the specific environment. Such confirmation involves, at a minimum, a feedback loop of information (verification in real time) using the results of step 408 (receiving information about sensed moving objects subsequent to the prior evaluation(s)), re-evaluation using the then-current information (in step 412) and the additional attempts to confirm and track the movements of the specified moving objects (in step 412). Once confirmation has been made with the desired level of certainty, step 414 is the evaluating of possible impacts of the presence and/or operation of the moving objects within the specific environment, Thereafter, step 416 is the initiating of actions (if need be) within the specific environment based upon the identification of the moving objects and the possible impacts thereof A ninth step (418) is the communicating (e.g., transmitting) of desired information about (x) the moving objects in the specific environment and (y) any actions to be initiated in connection with the moving objects to other systems and/or devices. Preferably, the necessary details of the communication of step 418 for the continued evaluation of the moving object are feed to be used in the continued operation of evaluating step 410.

In an embodiment of method depicted in FIG. 4 could be used in connection of airborne drone detection, the receiving information (402) about certain fixed objects in such specific environment could be accomplished through the use of radar devices, cameras, other receivers or a combination of the foregoing. Step 404—receiving information about the then-current parameters of the specific environment—could be accomplished through the use of devices and mechanisms similar to the devices and mechanisms used in step 402, by the same devices or mechanisms (if they have the adequate capacity) or devices or mechanisms that allow the user to input the applicable information manually or otherwise for receipt to be processed. Likewise, step 406—receiving information about movable objects expected to be in the specific environment—could similarly be accomplished by such devices and mechanisms as used in step 404. Fourth, step 408—receiving identifying information related to the actual moving object sensed within such specific environment—could be accomplished through the use of devices and mechanisms similar to or the same as the devices and mechanisms as used in step 402.

Information received in steps 402, 404, 406 and 408 (inclusive of preestablished and dynamically received information), are transmitted to a processor in which the information can be evaluated—a fifth step 410, In a sixth step 412, the results of evaluation step 410 can be used in attempts to confirm the presence and track the movement of moving objects within the specific environment. Such confirmation involves, at a minimum, a feedback loop of information (verification in real time) using the results of step 408 (receiving information about sensed moving objects subsequent to the prior evaluation(s)), re-evaluation using the then-current information (in step 412) and the additional attempts to confirm and track the movements of the specified moving objects (in step 412). Once confirmation has been made with the desired level of certainty, step 414 is the evaluating of possible impacts of the presence and/or operation of the moving objects within the specific environment, Thereafter, step 416 is the initiating of actions (if need be) within the specific environment based upon the identification of the moving objects and the possible impacts thereof.

A ninth step 418 is the communicating (e.g., transmitting) of desired information about (x) the moving objects in the specific environment and (y) any actions to be initiated in connection with the moving objects to other systems and/or devices. Preferably, the necessary details of the communication of step 418 for the continued evaluation of the moving object are feed to be used in the continued operation of evaluating step 410.

Figure 5:
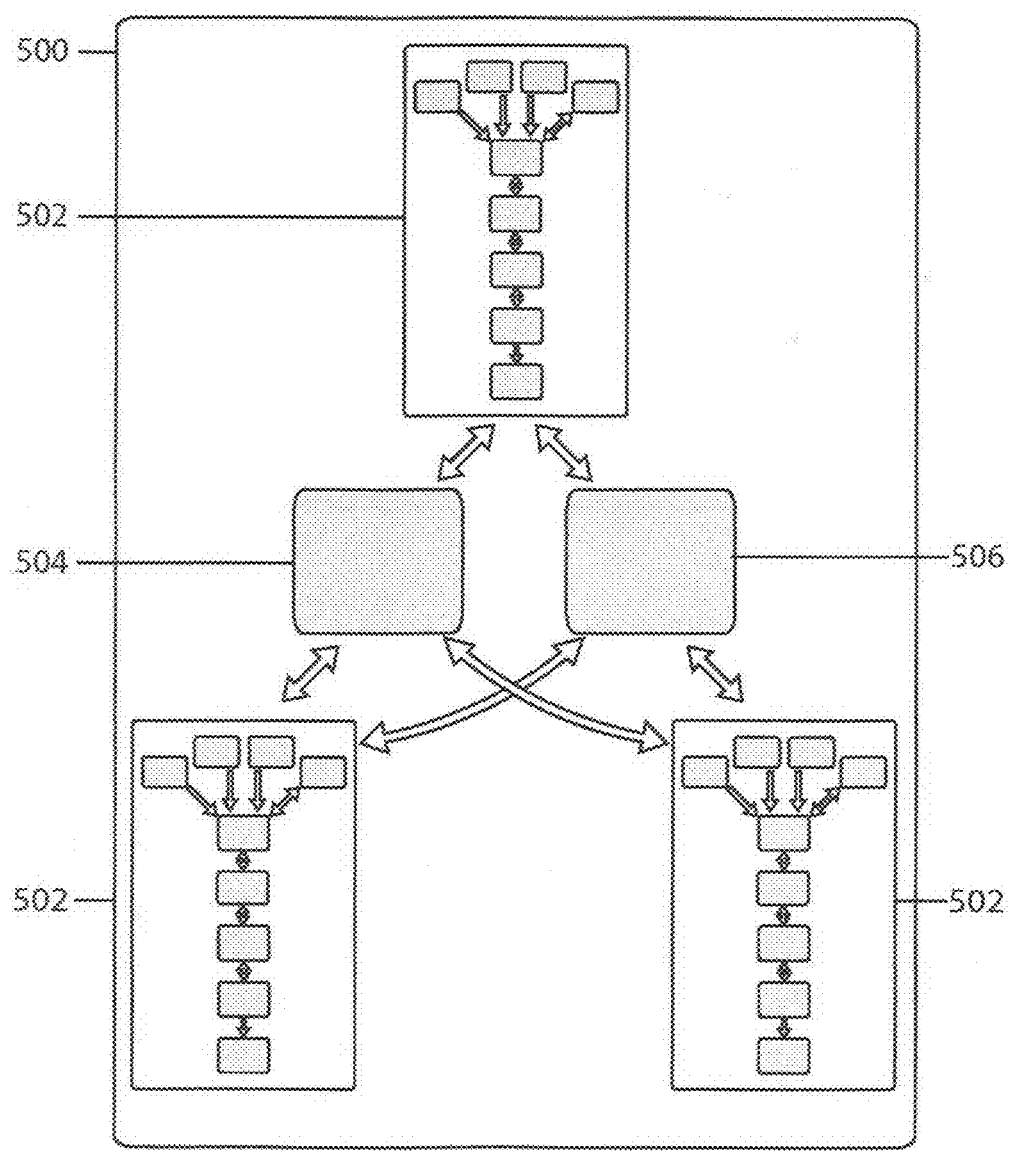
FIG. 5 shows an embodiment of the present inventive method in which one of the steps of the embodiment of the invention is the combination of the steps shown in FIG. 4, and additionally the FIG. 5 method includes the receiving of additional information and the processing and transmission of such additional information for additional evaluation.

FIG. 5 shows an embodiment of the present inventive method (500) in which the steps of the method shown in FIG. 4 are depicted as step 502. In this embodiment, step 504 comprises the receiving information about then-current parameters outside of such specific environment. Step 506 comprises the receiving information about such moving object, when such moving object is outside of such specific environment, for the evaluation of the possibility that such moving object will enter into such specific environment. Such information (received in steps 504 and 506) is transmitted to be processed through the operation of the collection of steps 502, specifically to be evaluated in an operation that is equivalent to step 410 in FIG. 4.

In an embodiment of method depicted in FIG. 5 could be used in connection of airborne drone detection, step 504—receiving information about movable objects expected to be in the specific environment—could be accomplished through the use of devices and mechanisms similar to the devices and mechanisms used in step 402, by the same devices or mechanisms (if they have the adequate capacity) or devices or mechanisms that allow the user to input the applicable information manually or otherwise for receipt to be processed.

The receiving of information 506 about moving objects outside of the specific environment—could be accomplished through the use of devices and mechanisms similar to the devices and mechanisms used in step 402, but with or set for longer ranges of detection or by the same devices or mechanisms (if they have the adequate capacity) as in step 402 (set to longer ranges) or devices or mechanisms that allow the user to input the applicable information about the outside parameters manually or otherwise for receipt to be processed.

Figure 6:
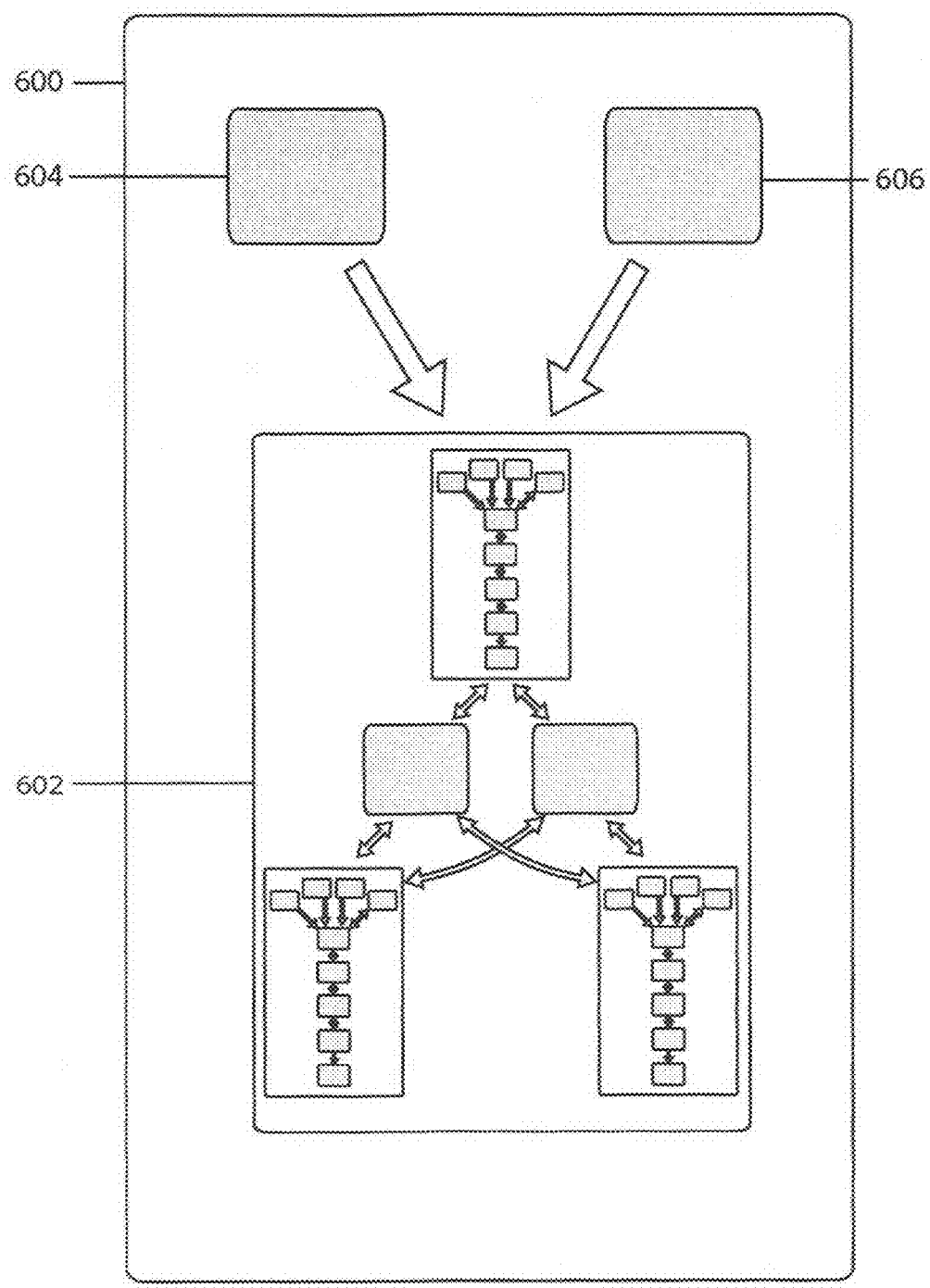
FIG. 6 shows an embodiment of the present inventive method in which one of the steps of the embodiment of the invention is the combination of the steps shown in FIG. 5, and additionally the FIG. 6 method includes the supplying of information for additional identification and evaluation.

FIG. 6 shows a third embodiment of the present inventive method (600) in which the combination of method 400 in FIG. 4 and the additional steps of FIG. 5 are depicted as step 602. FIG. 6 also shows step 604—the supplying of information can be used to further identify such moving object and to further evaluate the possible impacts of the presence and operation of such moving object within such specific environment. Such information (supplied by steps 604) is transmitted in to be processed through the operation of the collection of steps 602, specifically to be evaluated in an operation that is equivalent to step 410 in FIG. 4. FIG. 6 also shows step 606—the supplying of information that can be used to update 602 (and 500 as well as 400) with up-to-date information that improves the performance of the system, such as characteristics of objects and potential target candidates which have recently been identified post-deployment of the system.

In an embodiment of method depicted in FIG. 6 could be used in connection of airborne drone detection, step 604—supplying additional information for use by the processor—could be accomplished through the use of devices and mechanisms—manually operated or otherwise in a manner for receipt of information to be processed.

With the elements of the system and the steps of the method discussed in summary above and in more detail immediately above, the present invention can also be configured to perform, for example, bi-static or multi-static monitoring. Multi-static monitoring supports the simultaneous monitoring of differing aspects of a moving object. This enhanced monitoring capability is achieved in part by the spatial separation of the system elements. As such, multi-static monitoring facilitates the potential collection of a quantity, quality and detail of information that is more advantageous relative to conventional systems. With pre-established or 'on-the-fly' parameters that facilitate the weighting and integrating the information data points, monitoring can be augmented as such information is cross-referenced and integrated with information from, for example, other sources (such as, other components of a multi-static system, mono-static operations, or bi-static technologies). The various elements of the present inventive system could also collaborate in accommodate for various environmental factors. For example, one element (say, a multi-static subsystem) and another element (say, a bi-static subsystem) could compute their respective signal strengths on any given day (given, for example, the weather conditions or power constraints) and adjust their respective operations to maximize the desired overall performance of the entire system (e.g., accommodating for the differences among clear, snowy, dry and humid days). The present system and method can also communicate beyond the confines of the primary operation to confirm, evaluate and validate the presence of other moving object (e.g. a presence of a detected drone can be cross-checked with via interrogation of a UAS Traffic Management System (UTM)). In this way, the system and method assist in checking for a drone's registration to fly at that time in that location. A ground-focused version of the present inventive system and method can, for example, detect humans and verify with central command if any authorized people are supposed to be at a particular place at a particular time (e.g. the system and method could detect a human and then interrogate central command to see whether or not the detected person matches the current patrol location of a security guard). By extension, the system can continue to flag the status of the detected object, even after the object has left detection range. This allows the system to verify whether a detected person, drone, etc. has left the area, been dealt with or has found a way to elude detection and therefore additional action might be called for (i.e. this is the opposite of "out of sight, out of mind").

Because, in part, of the connectivity and information sharing of the present invention, in addition to its capability of distinguishing between stationary and moving objects, the elements of the present invention have the capability to use the information available to the system, to self-calibrate, reduce false alarms, and self-adapt to changes in the local environment. For example, a system element is given the exact location of one or more stationary objects and uses that information, along with additional information provided through monitoring, to improve that element's sensing accuracy. Additionally, multiple system elements that are monitoring the same target can use their shared information to expose any "shadow zones" that each element would normally experience on its own. By way of further example, a system element monitoring a known target could automatically update its own model, as well as the overall system's model for local conditions (e.g., radar absorption, infrared absorption and visible light absorption) and therein the system could use the updated model to re-calibrate effective sensing ranges in the then-current conditions. There can also be cases in which a system element generates a signal that can be received by another system element. If the strength and possibly other characteristics of the generated signal are known, the two system elements could calibrate and, as necessary, re-calibrate to better ensure coverage based upon the shared signal strength information. The present system could also, for example, suppress false alarms. One approach in this effort would be for a first system element to begin monitoring a target which, based upon the location and signal strength of the first system element, would suggest that the target would also be detectible by a second system element. Accordingly, the second system element could be used to verify or dispute the detection of the first system element.

Additional Thoughts

The foregoing descriptions of the present invention have been provided for the purposes of illustration and description. It is not intended to be exhaustive or to limit the invention to the precise forms disclosed. Many modifications and variations will be apparent to the practitioner of ordinary skilled in the art. Particularly, it would be evident that while the examples described herein illustrate how the inventive system may look and how the inventive process may be performed. Further, other elements and/or steps may be used for and provide benefits to the present invention. The depictions of the present invention as shown in the exhibits are provided for purposes of illustration.

The embodiments were chosen and described in order to best explain the principles of the invention and its practical application, thereby enabling others of ordinary skill in the art to understand the invention for various embodiments and with various modifications that are suited to the particular use contemplated.

What is claimed is:

1. An inventive system capable of detecting and acting upon a moving object in a specific environment comprising:
   a processing element in which both preestablished and dynamically received information can be processed and wherein such processing element can (a) aggregate and integrate information from at least one source to efficiently and accurately confirm the presence and movement of such moving object detected within the specific environment, (b) aggregate and integrate information from at least one additional source to efficiently and accurately evaluate any possible impacts of the presence and operation of such moving object detected within the specific environment; and (c) initiate actions based upon (x) the identification of such moving object detected and (y) the possible impacts thereof within the specific environment, wherein the ability to aggregate and integrate information facilitates the 'self-adapt' of such system to changes in the specific environment;
   an input element for receiving information about certain objects in the specific environment, wherein such input element is focused primarily upon fired objects in the specific environment and such input element is electronically connected to the processing element;
   a receiving element through which information about then-current parameters of the specific environment can be received, which such receiving element is focused primarily upon the current environment and is electronically connected to the processing element;
   a moving object input element for receiving information about certain expected objects in the specific environment, where such input element is focused primarily upon moving objects that are expected to be in the specific environment and is electronically connected to the processor;
   a moving object detector for receiving information about certain detected objects in the specific environment, wherein such detector is focused. upon information related to moving objects sensed within the specific environment and is electronically connected to the processing element; and
   a communicating element for transmitting information to devices and systems outside of the present inventive system from one or more elements in the present inventive system, inclusive of the processor, the input element, the receiving element and the mentioned detecting elements, with such information transmitted being (x) desired information about detected moving objects in the specific environment and (y) actions to be initiated in connection with the moving objects detected, with the communicating element electronically connected to the same processing element.

2. The present inventive system of claim 1 wherein the communicating element is capable of also receiving information that can be utilized in the operation and functioning of the processing element.

3. The present inventive system of claim 1 wherein the moving object detector is mounted on an airborne drone.

4. The present inventive system of claim 3 wherein the information detected by the moving object detector on the drone is used to improve position reporting accuracy by the present inventive system and generally used to debug and validate the present inventive system, while such drone is moved throughout the specific environment.

5. The present inventive system of claim 1 wherein the processing element is configured to assist in the self-calibration of the present inventive system by analyzing information from multiple sources and using the information from the differing sources to confirm the then-current 'base set' conditions when the present inventive system is initiated.

6. The present inventive system of claim 1 wherein the processing element is capable of storing preloaded information needed to confirm the presence and movement of detected moving objects.

7. The present inventive system of claim 1 further comprising a separate storage element in which information needed to confirm the presence and movement of detected moving objects can be stored for access during the operation of the present inventive system.

8. The present inventive system of claim 2 wherein the processing element employs outside software to assist in the performance of the confirmation tasks of the processing element.

9. The present inventive system of claim 1 wherein fixed object input element is a port through which information about the specific environment is uploaded into the present inventive system.

10. The present inventive system of claim 1 wherein the fixed object input element is a sensory device electronically connected to the processing element.

11. The present inventive system of claim 1 wherein the fixed object input element further comprises a subsystem capable of mapping fixed aspects of the specific environment.

12. The present inventive system of claim 11 wherein the subsystem is interconnected with at least one drone capable of (A) tracking its own location, (B) sensing and characterizing its own performance and the local environmental effects, (C) improving its own applicable position reporting accuracy, and (D) otherwise validating the detectors of the present inventive system.

13. The present inventive system of claim 1 further comprising detecting elements outside of the specific environment capable of receiving information about then-current parameters outside of the specific environment and detecting elements outside of the specific environment capable of receiving information about such moving objects when such moving objects are outside of the specific environment, with such parameters and object detecting elements both electronically connected with the processing element.

14. The present inventive system of claim 13 further comprising an information source capable of providing information that can be used to further identify moving objects and to further evaluate the possible impacts of the presence and operation of such moving object within the specific environment, with such information source electronically connected to the processing element.

15. The present inventive system of claim 14 wherein such information source is a 'built-in' database electronically connected to the processing element.

16. An inventive method of detecting and acting upon a moving object in a specific environment comprising the steps of:
- receiving information about certain fixed objects in the specific environment;
- receiving information about the then-current parameters of the specific environment;
- receiving information about moving objects expected to be in the specific environment;
- receiving identifying information related to the actual moving objects sensed within the specific environment;
- processing preestablished and dynamically received information (a) with the aggregation and integration of information from multiple sources, to more efficiently and accurately confirm the presence, identity and movement of moving objects within the specific environment, (b) with the aggregation and integration of information from multiple sources, to more efficiently and accurately evaluate possible impacts of the presence and operation of the moving objects within the specific environment, and (c) to initiate any actions need within the specific environment based upon the identification of the moving objects and the possible impacts thereof, wherein the ability to aggregate and integrate information facilitates the 'self-adapt' of such system to changes in the specific environment;
- communicating desired information to other systems and devices about (x) the moving objects in the specific environment and (y) any actions to be initiated in connection the moving objects.

17. The method of claim 16 wherein the receiving of information about certain fixed objects is performed in preestablished intervals of time, depending upon the expected change in such fixed objects over time.

18. The method of claim 17 wherein the receiving of information about the then-current parameters of the specific environment is performed over time in intervals, with the more acceptable interval of time being shorter in duration than the interval for fixed objects.

19. The method of claim 16 wherein the information received, inclusive of preestablished and dynamically received information, is transmitted to a processor in which the information can be evaluated.

20. The method of claim 16 wherein the results of the evaluation step can be used in attempts to confirm the presence and track the movement of moving objects within the specific environment.

21. The method of claim 16 further comprising the step of receiving information about then-current parameters outside of the specific environment.

22. The method of claim 16 further comprising the step of receiving information about such moving object, when such moving object is outside of the specific environment, for the evaluation of the possibility that such moving object will enter into the specific environment.

23. The method of claim 16 wherein the step of receiving information about moving objects expected to be in the specific environment is accomplished through the use of devices and mechanisms similar to the devices and mechanisms that allow the user to input the applicable information manually.

24. The method of claim 23 wherein the receiving of information about moving objects outside of the specific environment is accomplished through the use of devices and mechanisms set for areas of detection outside the specific environment.

25. The method of claim 16 further comprising the step of supplying information for further identifying such moving object and further evaluating the possible impacts of the presence and operation of such moving object within the specific environment.

26. The method of claim 25 further comprising the step of supplying up-to-date information, such as characteristics of objects and potential target candidates which have recently been identified post-deployment of the present inventive system, that improves the performance of the present inventive system.

27. The method of claim 23 further comprising the step of supplying additional information for use by the processor, with such information supplied through the use of devices and mechanisms manually operated.

* * * * *